No. 793,952. PATENTED JULY 4, 1905.
B. W. PERRIGO.
ELECTRICAL LAMP FIXTURE.
APPLICATION FILED NOV. 3, 1904.
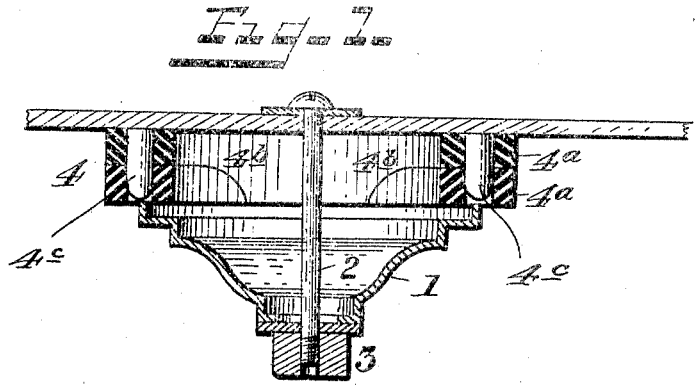
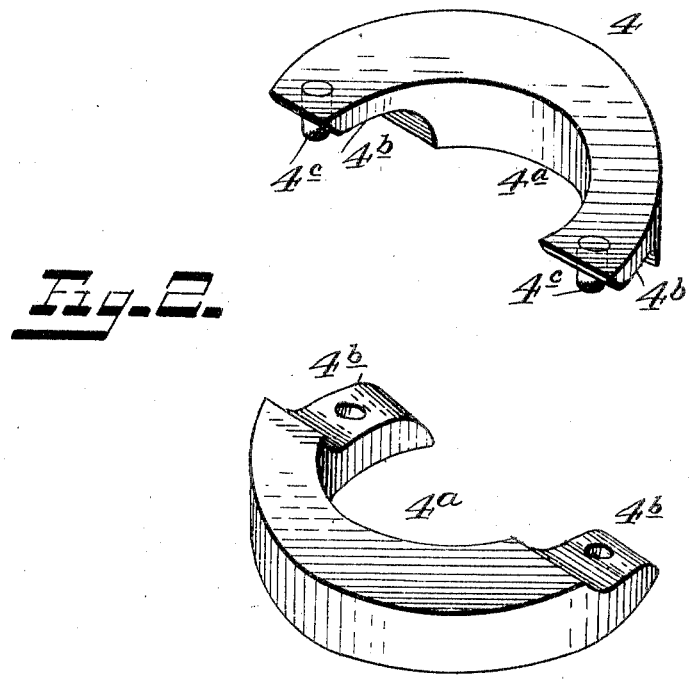

No. 793,952. Patented July 4, 1905.

UNITED STATES PATENT OFFICE.

BENJAMIN W. PERRIGO, OF AUBURN, NEW YORK.

ELECTRICAL-LAMP FIXTURE.

SPECIFICATION forming part of Letters Patent No. 793,952, dated July 4, 1905.

Application filed November 3, 1904. Serial No. 231,232.

*To all whom it may concern:*

Be it known that I, BENJAMIN W. PERRIGO, a citizen of the United States, residing at Auburn, in the county of Cayuga and State of New York, have invented new and useful Improvements in Electrical-Lamp Fixtures, of which the following is a specification.

My invention relates to improvements in electrical-lamp fixtures particularly designed for metallic ceilings.

It has for its object to promote convenience and facility, as in repairing fixtures already in position, and to do this in a simple, quick, and inexpensive manner; and to these ends the invention consists of certain structural features, substantially as hereinafter fully disclosed, and particularly pointed out by the claims.

In the accompanying drawings, illustrating the preferred embodiment of my invention, Figure 1 is a sectional elevation thereof. Fig. 2 is a perspective view showing the insulation member detached or removed from its position and its sections disassembled.

In the carrying out of my invention, I provide the usual cap or canopy 1, with the conductor 2, as formerly, passing therethrough and suitably secured or fixed in position to the same, as at 3. Interposed between said canopy or cap 1 and the metallic ceiling is an insulation member 4, circular or ring-shaped in general outline, which is in two parts or sections $4^a$ $4^a$ instead of in a single entirety, as heretofore.

In the use of the insulation member produced in a single piece it is necessary to remove the entire fixtures, including the canopy or cap, with its securing-nuts, to renew the insulation or otherwise repair the fixtures. Having the insulation member in sections or two parts, as in my invention, it will be noted that the same may be substituted for the worn-out or impaired insulation by introducing said sections laterally in place, thus obviating the aforestated objections. Said sections have their respective end portions adapted to overlap each other, preferably upon curved lines, as at $4^b$, and are suitably secured together by wooden or insulated pegs $4^c$ inserted therethrough.

Latitude, it will be understood, is allowed as to details herein, as they may be changed as circumstances suggest without departing from the spirit of my invention.

I claim—

1. In an electrical-lamp fixture, an insulation member of the character described, in sections, adapted to be inserted laterally in position, with their end portions overlapping each other and pinned together.

2. In an electrical-lamp fixture, an insulation member of the character described, in sections, adapted to be inserted laterally in position, with their end portions overlapping each other upon curved lines, and means connecting said sections together.

In testimony whereof I affix my signature in presence of two subscribing witnesses.

BENJAMIN W. PERRIGO.

Witnesses:
T. H. GARRETT, Jr.,
H. R. KIDNEY.